United States Patent [19]

Werner et al.

[11] Patent Number: 4,599,094

[45] Date of Patent: Jul. 8, 1986

[54] ENHANCED PRESSURE SWING ADSORPTION PROCESSING

[75] Inventors: Robert G. Werner, Danbury, Conn.; Homer Fay, Snyder, N.Y.

[73] Assignee: Union Carbide Corporation, Danbury, Conn.

[21] Appl. No.: 709,171

[22] Filed: Mar. 7, 1985

[51] Int. Cl.$^4$ .............................................. B01D 53/04
[52] U.S. Cl. .......................................... 55/26; 55/58; 55/62; 55/68; 55/73; 55/75
[58] Field of Search ................... 55/25, 26, 31, 33, 35, 55/58, 62, 68, 73–75

[56] References Cited

U.S. PATENT DOCUMENTS

| | | | |
|---|---|---|---|
| 3,085,379 | 4/1963 | Kiyonaga et al. | 55/58 X |
| 3,138,439 | 6/1964 | Skarstrom | 55/58 X |
| 3,226,913 | 1/1966 | Avery | 55/25 |
| 3,266,221 | 8/1966 | Avery | 55/58 |
| 3,636,679 | 1/1972 | Batta | 55/26 |
| 3,717,974 | 2/1973 | Batta | 55/58 |
| 3,797,201 | 3/1974 | Tamura | 55/62 |
| 4,013,429 | 3/1977 | Sircar et al. | 55/58 X |
| 4,070,164 | 1/1978 | Miwa et al. | 55/26 |
| 4,129,424 | 12/1978 | Armond | 55/25 |
| 4,144,037 | 3/1979 | Armond et al. | 55/58 |
| 4,144,038 | 3/1979 | Armond | 55/58 |
| 4,168,149 | 9/1979 | Armond et al. | 55/58 X |
| 4,171,207 | 10/1979 | Sircar | 55/58 X |
| 4,264,340 | 4/1981 | Sircar et al. | 55/25 |
| 4,340,398 | 7/1982 | Doshi et al. | 55/58 X |

*Primary Examiner*—Robert Spitzer
*Attorney, Agent, or Firm*—A. H. Fritschler

[57] ABSTRACT

A feed gas is passed to a pressure swing adsorption system, each bed of which undergoes a processing cycle that includes (1) pressurization (2) copurge at upper adsorption pressure, (3) countercurrent depressurization, including, in some embodiments, evacuation to a lower subatmospheric desorption pressure. By recycling effluent gas released upon copurge and countercurrent depressurization for use in the pressurization or the copurge step, the more readily adsorbable component of the feed gas is advantageously recovered at high purity and at high recovery levels. Enriched less readily adsorbable component is also recoverable as coproduct effluent at relatively high recovery levels. The process can be advantageously employed for the separation and recovery of product nitrogen from air.

50 Claims, No Drawings

ENHANCED PRESSURE SWING ADSORPTION PROCESSING

BACKGROUND OF THE INVENTION

1. Field of the Invention

The invention relates to the recovery of the more readily adsorbable component of a gas mixture. More particularly, it relates to the recovery of nitrogen from air using pressure swing adsorption processing.

2. Description of the Prior Art

In numerous chemical processing, refinery, metal production and other industrial applications, high purity nitrogen is desired for purging, blanketing, the providing of metal treating atmospheres, and other purposes. Enriched oxygen gas is also frequently required for various purposes in the same facility. Nitrogen and oxygen can, of course, be obtained by various known techniques for air separation. Pressure swing adsorption (PSA) processing is particularly suited for such air separation in a variety of applications, particularly in relatively small sized operations for which the use of a cryogenic air separation plant may not be economically feasible.

In the PSA process, a feed gas mixture containing a more readily adsorbable component and a less readily adsorbable component are commonly passed to an adsorbent bed capable of selectively adsorbing the more readily adsorbable component at a higher adsorption pressure. The bed is thereafter depressured to a lower desorption pressure for desorption of said more readily adsorbable component and its removal from the bed prior to the introduction of additional quantities of the feed gas mixture to the bed as cyclic adsorption-desorption operations are continued in said bed. As those skilled in the art will readily appreciate, the PSA process is commonly employed in multi-bed systems, with each bed employing the PSA processing sequence on a cyclic basis interrelated to the carrying out of such processing sequence in the other beds in the system.

There have been numerous attempts to enhance the PSA process, particularly to lower capital costs, increase reliability and minimize operating costs, as by achieving relatively low power consumption per unit of product being produced. One desirable goal in the achieving of such overall objectives is to enable the production of relatively high purity coproduct in addition to the desired high purity product. As applied to air separation and other gas separation operations, the Batta patent, U.S. Pat. No. 3,636,679, discloses a PSA cycle as applied to two or more beds wherein each bed is partially repressurized from a lower desorption pressure by simultaneous feed gas-product gas introduction from opposite ends of the bed followed by further repressurization to higher adsorption pressure by feed gas alone, after which the bed is cocurrently depressurized with release of less readily adsorbable component from the discharge end thereof, a portion thereof being recovered as product gas and the remainder being used for pressure equalization and providing purge gas to another bed or beds in the system. The bed is then countercurrently depressurized with release of gas from the feed end of the bed and purged prior to commencing partial repressurization using additional feed gas as cyclic operations are carried out on a continuous basis. The approach of this patent has been successfully employed in air separation operations intended to recover product oxygen as the less readily adsorbable component of air.

The Batta process is not applicable, however, to the recovery of the more readily adsorbable component of air, e.g. nitrogen, as the desired high purity product gas.

Various other processes exist, however, in which it is desired to recover the more readily adsorbable component as product gas. Such processes commonly employ a vacuum cycle in which the more readily adsorbable component of the gas mixture is desorbed from the bed at a subatmospheric desorption pressure. Thus, the Tamura patent, U.S. Pat. No. 3,797,201, discloses an air separation process that includes the introduction of air at atmospheric adsorption pressure into an adsorbent bed capable of selectively adsorbing the more readily adsorbable nitrogen component thereof, followed by vacuum desorption to recover said nitrogen as desired product gas. To increase the purity of the product nitrogen, Tamura teaches the carrying out of the initial adsorption step with release of oxygen-rich gas from the discharge end thereof until breakthrough of the adsorption front at said discharge end of the bed and the use of a cocurrent purge at said higher adsorption pressure, using nitrogen for purge, prior to countercurrent vacuum desorption and repressurization. The application of this process tends to be limited by the unavailability of coproduct oxygen at a useable pressure and in an energy efficient manner, although high purity nitrogen product can be obtained thereby. A similar processing cycle is described in the Sircar et al patents, U.S. Pat. Nos. 4,013,429 and 4,264,340, that employs two adsorption trains, each consisting of a pretreatment bed and a main separation bed, together with variable volume surge tanks to accommodate discontinuous flow rates between processing steps.

Vacuum desorption is likewise employed in the process of the Miwa et al patent U.S. Pat. No. 4,070,164, which includes pretreatment for cleaning and drying air and a processing cycle that includes (1) pressurization of a bed to about 4 atm by air feed, (2) cocurrent purge at said elevated pressure with nitrogen to remove an oxygen-rich stream from the discharge end of the bed, (3) countercurrent depressurization to atmospheric pressure with release of nitrogen-rich gas from the feed end of the bed, and (4) vacuum desorption to about 0.3 atm with release of additional nitrogen-rich gas from said feed end of the bed. By the combining of gas released during the two countercurrent depressurization steps, a constant flow of high purity nitrogen is recovered from the system, although the recovery level for the desired nitrogen is quite low using this approach. The same four processing steps were also disclosed in the Armond patent, U.S. Pat. No. 4,129,424, which also provides for the cocurrent purge step to be carried out at a pressure substantially equal to the partial pressure of the nitrogen in the feed gas, thereby significantly reducing the amount of purge gas required to saturate the bed as compared with similar processes in which purging is carried out at a higher pressure. This, in turn, leads to the inclusion of a cocurrent venting step after air feed introduction to reduce the pressure of the bed to that of the purge gas.

Despite such efforts in the art, there remains a need for the development of a PSA process for the production of nitrogen as the selectively adsorbed component of air, wherein the desired product can be recovered at high purity and high recovery levels, together with a valuable production of oxygen-enriched coproduct. Those skilled in the art will also appreciate that there is a similar need and desire in the art for such a process capable of facilitating the recovery of the more readily adsorbable component of a gas mixture, at high purity and recovery levels, together with relatively high recovery of the less readily adsorbable component as coproduct.

It is an object of the invention, therefore, to provide an improved PSA process.

It is another object of the invention to provide a process for the recovery of nitrogen from air by the use of PSA technology.

It is another object of the invention to recover nitrogen at high purity and recovery levels as the more readily adsorbable component of air passed to a PSA system.

It is a further object of the invention to provide a PSA process capable of achieving high purity and high recovery levels of the more readily adsorbable component of a gas mixture, together with relatively high recovery of enriched, less readily adsorbable component gas as a coproduct gas.

With these and other objects in mind, the invention is hereinafter described in detail, the novel features thereof being particularly pointed out in the appended claims.

SUMMARY OF THE INVENTION

The PSA processing steps of (1) pressurization, (2) copurge, and (3) countercurrent depressurization to lower desorption pressure are carried out in a manner enhancing the recovery and purity of the more readily adsorbable component of a gas mixture. For this purpose, a portion of the coproduct effluent gas released from the bed upon copurge with more readily absorbable component at elevated pressure is recovered as less readily adsorbable component coproduct gas, while an additional portion thereof is introduced to the discharge end of a bed being repressurized also by the introduction of feed gas to the feed end thereof and a third portion is introduced to the feed end of a bed after said bed is at least partially repressurized. Gas subsequently released from the feed end of the bed upon countercurrent depressurization is employed as said copurge gas, with a high level of recovery of high purity, more readily adsorbable component product gas being accompanied, in various embodiments, by the relatively high recovery of the less readily adsorbable component as enriched coproduct gas.

DETAILED DESCRIPTION OF THE INVENTION

The invention as herein described and claimed enables the objectives thereof to be accomplished in an advantageous manner, desirably enabling high purity nitrogen to be separated and recovered from feed air at high recovery levels as the more readily adsorbable component thereof. A highly oxygen-rich coproduct effluent gas mixture comprising the less readily adsorbable component of the feed air is also recoverable at relatively high recovery levels, further enhancing the practice of the invention in PSA processing. As indicated below, the invention can be applied to a variety of gas separation applications other than said air separation, wherein it is desired to recover, by PSA processing, the more readily adsorbable component of a gas mixture as the desired product. For convenience, however, the various processing steps of the invention, and permissible modifications therein, are described with particular reference to air separation operations and to the recovery of nitrogen as the desired product.

The PSA cycle to which the invention pertains for air separation, with modifications enabling the objectives to be achieved, comprises: (1) pressurization of each adsorbent bed from lower, subatmospheric desorption pressure to upper adsorption pressure, (2) copurge by the introduction of more readily adsorbable component gas to the feed end of the bed at said upper adsorption pressure, with release of enriched, less readily adsorbable component gas from the discharge end of the bed, (3) countercurrent depressurization of the bed with release of more readily adsorbable, component-rich gas from the feed end of the bed, with the bed being depressurized during this step to said lower, subatmospheric desorption pressure. By carrying out this PSA cycle with the particular variations herein disclosed and claimed, the more readily adsorbable component, i.e., nitrogen, is recovered at high purity and with high recovery, while oxygen-enriched coproduct gas is likewise obtained at desirable, relatively high recovery levels.

With an adsorbent bed initially at its lower, subatmospheric desorption pressure following recovery of nitrogen as the more readily adsorbable component product gas, feed air and coproduct effluent gas are used to increase the pressure thereof from said lower desorption pressure to the upper adsorption pressure. The combined addition of gas to the bed being pressurized from the opposite ends thereof, simultaneously or otherwise, serves to increase the pressure of the bed from said lower, subatmospheric desorption pressure to said upper adsorption pressure at which the nitrogen copurge step is carried out. In one embodiment, feed air is passed to the feed end of the bed increase the pressure thereof, simultaneously with the passage of said coproduct effluent gas to the discharge end of said bed, sometimes referred to as "oxygen backfill". In a desirable embodiment, the bed is initially partially repressurized, for example, the first 20% or less of the total repressurization, by the introduction of coproduct effluent gas to the discharge end of the bed, after which repressurization is continued simultaneously from both ends of the bed. It is also possible to repressurize the bed to an intermediate pressure level by said oxygen backfill, followed by feed air introduction to further increase the pressure thereof to the desired upper adsorption pressure. In addition, a nitrogen-rich recycle stream obtained as described hereinbelow, is passed to the feed end of a bed undergoing adsorption at a pressure ranging from the intermediate to the highest adsorption pressure. The passage of feed air to the bed may be suspended during addition of this recycle stream.

The introduction of nitrogen copurge gas to the feed end of the bed at the upper adsorption pressure causes the displacement of coproduct effluent gas from the discharge of the bed, prior to countercurrent depressurization and withdrawal of nitrogen from the bed through the feed end thereof. A portion of said coproduct effluent is not withdrawn from the system, however, but is introduced to the discharge end of the bed being repressurized as indicated above. It will be appreciated that, as nitrogen copurge gas is added to the feed end of the bed at said upper adsorption pressure, and as coproduct effluent is withdrawn from the discharge end thereof, there will be an increase in the nitrogen content of the coproduct effluent gas. As the nitrogen copurge step is continued, the nitrogen concentration reaches a predetermined level in the coproduct effluent gas stream. It will be appreciated that this nitrogen concentration can be any level desired or suitable for a given application. Preferably, the level will be such that the oxygen concentration of the coproduct effluent gas is less than about 30% of said coproduct gas, and more preferably, less than or equal to the concentration of oxygen in air.

After the nitrogen concentration has reached such a predetermined level in the coproduct effluent stream, additional nitrogen copurge gas continues to be introduced to the feed end of the bed, again essentially at said upper adsorption pressure. The more nitrogen-rich effluent gas displaced from the discharge end of the bed is not used, as was the earlier, more oxygen-rich gas, coproduct effluent gas, for coproduct recovery or for passage to the discharge end of the bed for pressurization purposes. To the contrary, the additional displaced effluent gas containing more than the predetermined level of nitrogen concentration therein is recycled to the feed end of another bed in the adsorption system that is at a pressure of from said intermediate pressure level to said upper adsorption pressure. Upon completion of this extension of the copurge step, i.e. when the copurge effluent reaches the desired ultimate level, such as up to about 95% or even 99% nitrogen, the bed is countercurrently depressurized from the upper adsorption pressure to a lower pressure with discharge of a nitrogen-rich gas from the feed end of the bed, said discharge nitrogen-rich gas comprising nitrogen copurge gas and/or product gas. The bed is then further countercurrently depressurized in the practice of the invention, by evacuation from said lower pressure reached in the previous steps to said subatmospheric desorption pressure. During this step, desorbed, high purity gas is discharged from the feed end of the bed, with this gas comprising nitrogen product gas and/or copurge gas as may be desired in the practice of particular embodiments of the invention. With such discharge of nitrogen from the bed and its evacuation down to the subatmospheric desorption pressure, the bed is then in condition for the passage of additional quantities of coproduct effluent gas and feed air to the discharge and feed ends thereof, respectively, as the processing steps indicated above are repeated on a cyclic basis as continuous processing operations are carried out in the adsorption system.

In the practice of the invention, the additional gas containing more than a predetermined level of nitrogen concentration therein discharged during the copurge step can be recycled to the feed end of a bed in the system for use either during the pressurization step therein or at the beginning of the copurge step before the introduction of the nitrogen gas stream used for said copurge step at the upper adsorption pressure. Thus, said additional gas containing more than a predetermined level of nitrogen concentration may be recycled, in one embodiment, for addition to the feed end of the bed together with, or after the addition of, the feed air being used to increase the pressure thereof to the upper adsorption pressure. In another embodiment, said additional gas may be recycled for introduction to the feed end of a bed at its upper adsorption pressure prior to the initial passage of nitrogen copurge gas to said bed.

The invention can be advantageously practiced in adsorption systems for the selective adsorption of nitrogen from air, or of other more readily adsorbable components of gas mixtures, wherein at least two adsorbent beds are employed, with each of the beds undergoing the processing cycle as herein disclosed and claimed in an appropriate sequence as related to the other beds in the system so that continuous gas separation operations can be carried out in such systems. In generally preferred embodiments of the invention, three or four adsorbent beds are employed. It will be understood that the process of the invention will generally be carried out using variations intended to enhance the operation of the particular system employed, as with the passage of feed gas to more than one bed at any given time in embodiments in which the number of beds employed lends itself to such operation.

A processing cycle of the invention for air separation and nitrogen product recovery is illustrated by the Table below with respect to a three bed adsorption system operated in accordance with a particular, representative embodiment of the invention:

TABLE

| Bed No. | Cycle | | |
|---|---|---|---|
| 1 | Pr | Co-p | BD/Evac |
| 2 | Co-p | BD/Evac | Pr |
| 3 | BD/Evac | Pr | Co-p |

In this Table with respect to each bed, Pr represents the pressurization steps wherein feed air is passed to the feed end of the bed while a portion of the oxygen-rich coproduuct gas being withdrawn from the discharge end of another bed in the system is introduced to the discharge end of the bed to increase the pressure thereof to an intermediate level, after which additional feed air is passed to said feed end of the bed to further increase its pressure and a recycle stream from said other bed may complete the pressurization thereof to the upper adsorption pressure or may be introduced to the bed at the upper adsorption pressure at which the copurge step is carried out. Co-p represents said copurge step at upper adsorption pressure, wherein nitrogen recovered during countercurrent depressurization is employed as copurge gas for introduction to the feed end of the bed to displace oxygen-rich coproduct effluent gas from the discharge end of the bed. A portion of said coproduct effluent gas is passed to the discharge end of a bed being pressurized, and a further portion is taken as a coproduct or waste stream until a predetermined nitrogen level is reached. Said copurge step is then continued with additional gas containing more than said predetermined level of nitrogen being displaced and recycled to the feed end of the bed being pressurized either (1) during the pressurization thereof to upper adsorption pressure with feed air, and/or (2) to complete said pressurization while feed air is suspended, and/or (3) prior to, or at the beginning of, said copurge step itself. BD/Evac represents two countercurrent depressurization steps, the first step depressurizing the bed to a lower pressure than said upper adsorption pressure and the second step depressurizing the bed further down to a subatmospheric desorption pressure, with high purity nitrogen product gas and copurge gas being discharged from the feed end of the bed. It will be seen that, in such a three bed embodiment of the invention, one bed is undergoing pressurization by feed air and coproduct gas introduction as indicated above, while a second bed undergoes copurge, and a third bed undergoes countercurrent depressurization initially by blowdown to a lower pressure and then by evacuation to subatmospheric desorption pressure. If the upper adsorption pressure is atmospheric pressure, it will be appreciated that both subsequent depressurizations will comprise evacuations. In similar four bed embodiments of the invention, each bed similarly passes through such a sequence of processing steps, with the third bed undergoing countercurrent depressurization to a pressure lower than said upper adsorption pressure, with the blowdown gas released from the feed end of the bed comprising nitrogen gas desirably used for copurge purposes although this gas, or a portion thereof, can also be recovered as high purity nitrogen product gas. The fourth bed, at the same time, undergoes further countercurrent depressurization by evacuation to subatmospheric desorption pressure, with the additional gas released from the feed end of the bed comprising high purity nitrogen recovered as product nitrogen, although such a gas or a portion thereof can be used as copurge gas.

It is preferable to employ the nitrogen-rich gas released upon countercurrent depressurization, or blowdown, from upper adsorption pressure to a lower pressure as copurge nitrogen gas for displacement of oxygen coproduct from a bed at upper adsorption pressure, since it requires less recompression to reach the upper adsorption pressure than if subsequently depressurized gas were employed. In such case, the high purity nitrogen released upon further countercurrent depressurization by evacuation to subatmospheric desorption pressure is recovered as desired nitrogen product gas. As indicated above, however, nitrogen released during the latter step can be employed for copurge purposes, and said nitrogen recovered during the initial countercurrent depressurization step can be recovered as product gas, or a portion of the gas released during each such countercurrent depressurization step can be recovered as product gas while another portion thereof is used for copurge purposes.

While the pressure levels employed in the various steps of the PSA process of the invention can be subject to variations depending upon the degree of separation desired, the particular adsorbent employed, and other circumstances pertaining to a given gas separation operation, the countercurrent depressurization by evacuation step involves, of course, the reduction of the pressure of the bed to a subatmospheric pressure level for effective desorption and recovery of high purity nitrogen or other more readily adsorbable component of a feed gas mixture. While the upper adsorption pressure is typically in excess of atmospheric pressure in various practical embodiments of the invention, it should be noted that it is also within the scope of the invention to employ the recited process with the upper adsorption pressure being approximately atmospheric pressure. In such cases, the lower pressure to which each bed is initially countercurrently depressurized following copurge will, of necessity, be less than atmospheric pressure although above the subatmospheric desorption pressure level reached in the further countercurrent depressurization step. The intermediate pressure level to which the bed, in certain embodiments, is initially pressurized by the use of feed air and/or recycled oxygen-rich coproduct gas is likewise typically greater than or equal to atmospheric pressure, although it may be subatmospheric in some embodiments, as where the upper adsorption pressure itself is about atmospheric pressure. In various practical embodiments, the upper atmospheric pressure employed will be up to about 32 psia, preferably about 30 psia, although higher pressure levels, for example 60 psia or higher, may also be employed. The subatmospheric desorption pressure may be as low as about 2 psia or less, typically ranging from about 2 to about 3.5 psia, with said initial lower pressure reached upon countercurrent depressurization being conveniently about atmospheric pressure and the intermediate pressure level reached during the initial pressurization being typically in excess of atmospheric pressure.

The following example will illustrate the benefits obtainable in the practice of the invention, but should not be construed as limiting the scope of the invention as recited in the appended claims. In three bed system such as that illustrated in the Table above, beds 8 ft. long and 2 inches in diameter were employed, with each bed containing 8 lbs. of 13X molecular sieve capable of selectively adsorbing nitrogen from air. A total cycle time of 6 minutes was employed, with pressurization, copurge and countercurrent depressurization, i.e., blowdown and evacuation, each comprising 2 minutes. During pressurization, feed air introduction together with simultaneous oxygen backfill by the introduction of coproduct effluent gas to the discharge end of the bed continued for 100 seconds, after which feed air introduction was continued for 20 seconds, with displaced gas containing more than the predetermined nitrogen concentration obtained during copurge also being recycled for addition to the bed with the feed air during said 20 seconds. During depressurization, the initial countercurrent depressurization, or blowdown, was carried out for 15 seconds with a portion of the nitrogen-rich gas discharged from the feed end of the bed being used as copurge gas and with the remainder of said gas being recovered as product gas. Evacuation to subatmospheric desorption pressure extended over a period of 105 seconds. The pressures employed ranged from 3.2 psia for said desorption pressure to 32 psia for the upper adsorption pressure at which copurge was carried out, with the blowdown step being carried out to atmospheric pressure. The feed air employed was laboratory air, i.e. a mixture of pure oxygen and pure nitrogen. Employing this process, product nitrogen of 99.9% purity was obtained with nitrogen recovery being greater than 98% of the nitrogen content of the feed gas. The coproduct effluent obtained was enriched oxygen having a purity of 90%. In another example operating under like conditions in said three bed system, product nitrogen purity of 99.8% was obtained at a nitrogen recovery of greater than 99%, with 93.6% pure oxygen obtained as coproduct.

Those skilled in the art will appreciate that the invention can be practiced using any commercially available adsorbent capable of selectively adsorbing a more readily adsorbable component from a gas mixture of said component with a less rapidly adsorbable component. Well known molecular sieves, such as 13X, 5A, 10X and mordenite are representative examples of the adsorbents that may be conveniently employed in the practice of the invention for desired gas separations. It will also be appreciated that apart from the high purity, high recovery production of nitrogen from air as hereinabove described, the invention can be advantageously employed for a wide variety of other gas separations in adsorption systems containing adsorbent material capable of selectively adsorbing one more readily adsorbable component from another less readily adsorbable component. Illustrative examples of other useful separations to which the invention may be applied to achieve such high purity, high recovery production of the more readily adsorbable component are carbon monoxide and nitrogen; carbon dioxide and methane; methane and nitrogen; and ethane and ethylene. With respect to air separation, it should also be noted that, without change in adsorbent to one selective for oxygen, and oxygen-enriched coproduct stream obtainable on the practice of the invention comprises 90+% pure oxygen, which compares favorably with conventional PSA-oxygen processes, providing an additional benefit from said practice of the invention.

Various other changes and modifications can be made in the details of the process without departing from the scope of the invention set forth in the claims. Upon completion of the oxygen backfill step, recycle of effluent gas to the feed end of a bed may be delayed until said effluent reaches a particular nitrogen level desired in a specific application of the invention. In this circumstance, effluent gas discharged in the interim can be discharged from the system, e.g. to waste, or otherwise disposed of as desired. In another embodiment, not necessarily constituting an alternate to the above, the passage of feed air to the bed being repressurized may be temporarily discontinued while the recycle stream is being fed to said bed until substantially all of the residual oxygen has been displaced from the bed. It is also within the scope of the invention to integrate a dryer into the system so as to yield a dry nitrogen or other desired product. Thus, product nitrogen can be compressed to a desired final pressure and dried by conventional means. It should also be noted that the feed air to the system may be pre-dried as an alternative to the drying of the product nitrogen, and that any stream, such as product nitrogen, air feed, or copurge effluent may be employed as dryer purge gas. When drying takes place after gas separation, the feed to the adsorbent bed will typically be wet. The front end of the bed then acts as a drying zone and does not contribute to the main gas separation per se. Under such circumstances, the effective separation zone is, therefore, somewhat smaller than the entire bed. The drying zone within a bed generally comprises less than 50% of the total bed. Upon depressurization, the previously adsorbed water is desorbed and leaves the bed with the product nitrogen.

The invention will be seen as providing a desirable and significant advance in the development of PSA technology for the recovery of nitrogen from air and other gas separations wherein high purity, high recovery production of the more readily adsorbable component of a gas mixture is desired. The recovery of an enriched coproduct stream, such as oxygen, at relatively high recovery levels further benefits the practice of the invention. By means of the novel combination of processing steps as herein disclosed and claimed, including said oxygen backfill step together with the recycling of copurge effluent, both product purity and product recovery are enhanced. The invention thus contributes in a highly advantageous manner to the development of desirable PSA technology in fulfilling important gas separation needs of industrial societies, as in the production of high purity nitrogen for a variety of industrial applications.

We claim:

1. An adiabatic pressure swing adsorption process for the selective adsorption of nitrogen from air, and the recovery of high purity nitrogen product, in an adsorption system having at least two adsorbent beds, each of which undergoes, on a cyclic basis, a processing sequence comprising:

(a) introducing coproduct effluent gas withdrawn from the discharge end of another bed in the system to the discharge end of said bed, before and/or simultaneously with the passage of feed to the feed end of the bed, thereby increasing the pressure of the bed from a subatmospheric desorption pressure to an intermediate pressure level;

(b) passing feed air to the feed end of said bed, with or without the passage of coproduct effluent to the discharge end thereof, for use in increasing the pressure thereof from said intermediate pressure level to an upper adsorption pressure;

(c) introducing nitrogen copurge gas to the feed end of the bed at said upper adsorption pressure to displace coproduct effluent gas from the discharge end of the bed, a portion of said coproduct effluent gas being introduced to the discharge end of a bed being pressurized from said desorption pressure level, the concentration of nitrogen in said coproduct effluent gas increasing during said copurge step, which is continued until the nitrogen concentration reaches a predetermined level in said coproduct effluent gas stream;

(d) introducing additional nitrogen copurge gas to the feed end of the bed at said upper adsorption pressure after the nitrogen concentration reaches said predetermined level in said effluent gas stream, with the additional displaced effluent gas containing more than the said predetermined level of nitrogen concentration therein being recycled to the feed end of a bed in the system that is being repressurized from said intermediate pressure level to said upper adsorption pressure and/or to said bed at the upper pressure level;

(e) countercurrently depressurizing said bed from the upper adsorption pressure to a lower pressure with discharge of a nitrogen-rich gas from the feed end of the bed, said discharged nitrogen-rich gas comprising nitrogen copurge gas and/or nitrogen product gas;

(f) further countercurrently depressurizing said bed by evacuation from said lower pressure to subatmospheric desorption pressure with discharge of desorbed, high purity gas comprising nitrogen product gas and/or copurge gas from the feed end of the bed, and (g) repeating steps (a)-(f) on a cyclic basis with additional feed air being passed to the bed being repressurized during step (b) or during steps (a) and (b), whereby product nitrogen can be readily obtained at high purity and recovery levels, and an oxygen-enriched coproduct can also be obtained at relatively high recovery levels.

2. The process of claim 1 in which said upper adsorption pressure is in excess of atmospheric pressure.

3. The process of claim 2 in which said lower pressure is approximately atmospheric pressure.

4. The process of claim 2 in which said upper adsorption pressure is up to about 60 psia and said subatmospheric desorption pressure is as low as about ½ psia.

5. The process of claim 4 in which said upper adsorption pressure is on the order of about 30 psia and said subatmospheric desorption pressure is on the order of about 2 psia.

6. The process of claim 5 in which said lower pressure is approximately atmospheric pressure.

7. The process of claim 1 in which said upper adsorption pressure is about atmospheric pressure.

8. The process of claim 1 in which said additional coproduct effluent gas containing more than a predetermined level of nitrogen concentration is recycled for addition to the feed end of the bed together with feed air being used to increase the pressure thereof from said intermediate pressure level to upper adsorption pressure.

9. The process of claim 8 in which said upper adsorption pressure is in excess of atmospheric pressure and said lower pressure is approximately atmospheric pressure.

10. The process of claim 9 in which said upper adsorption pressure is on the order of about 30–32 psia and said subatmospheric desorption pressure is from about 2 to about 3.5 psia.

11. The process of claim 8 in which said upper adsorption pressure is about atmospheric pressure.

12. The process of claim 1 in which said additional coproduct gas containing more than a predetermined level of nitrogen therein is recycled for introduction to the feed end of a bed at upper adsorption pressure prior to said introduction of nitrogen copurge gas thereto.

13. The process of claim 12 in which said upper adsorption pressure is in excess of atmospheric pressure and said lower pressure is approximately atmospheric pressure.

14. The process of claim 13 in which said upper adsorption pressure in on the order of about 30-32 psia and said subatmospheric desorption pressure is from about 2 to about 3.5 psia.

15. The process of claim 12 in which said upper adsorption pressure is about atmospheric pressure.

16. The process of claim 1 in which said introduction of oxygen-rich coproduct gas to the discharge end of the bed initially at said desorption pressure is carried out prior to and simultaneously with the passage of feed air to the feed end of said bed.

17. The process of claim 16 in which said upper adsorption pressure is in excess of atmospheric pressure.

18. The process of claim 17 in which said lower pressure is approximately atmospheric pressure.

19. The process of claim 16 in which said upper adsorption pressure is about atmospheric pressure.

20. The process of claim 1 in which said adsorption system contains three adsorbent beds.

21. The process of claim 20 in which one bed is undergoing pressurization in accordance with steps (a) and (b), while a second bed undergoes copurge in accordance with steps (c) and (d), and a third bed undergoes countercurrent depressurization in accordance with steps (e) and (f) as cyclic operation of the process in said three bed system continues in accordance with step (g).

22. The process of claim 21 in which said upper adsorption pressure is in excess of atmospheric pressure.

23. The process of claim 21 in which said upper adsorption pressure is approximately atmospheric pressure.

24. The process of claim 21 in which the introduction of oxygen-rich coproduct gas to the discharge end of the bed initially at said desorption pressure is carried out simultaneously with the passage of feed air to the feed end of said bed.

25. The process of claim 24 in which said additional coproduct gas containing more than a predetermined level of nitrogen is recycled for addition to the feed end of the bed together with feed air being used to increase the pressure thereof from said intermediate pressure level to the upper adsorption pressure.

26. The process of claim 1 in which said adsorption system contains four adsorbent beds.

27. The process of claim 26 in which one bed is undergoing pressurization by feed air and coproduct gas in accordance with steps (a) and (b), while a second bed undergoes copurge in accordance with steps (c) and (d), a third bed undergoes countercurrent depressurization in accordance with step (e), and a fourth bed undergoes further countercurrent depressurization by evacuation in accordance with step (f), with the feed air thereafter being passed to the evacuated fourth bed for the repressurization thereof, while the first bed undergoes copurge, the second bed undergoes countercurrent depressurization, and the third bed undergoes further countercurrent depressurization by evacuation as cyclic operation of the process in said four bed system continues in accordance with step (g).

28. The process of claim 27 in which said upper adsorption pressure is in excess of atmospheric pressure.

29. The process of claim 27 in which said upper adsorption pressure is approximately atmospheric pressure.

30. The process of claim 27 in which the introduction of oxygen-rich coproduct gas to the discharge end of the bed initially at said desorption pressure is carried out simultaneously with the passage of feed air to the feed end of said bed.

31. The process of claim 27 in which said additional coproduct gas containing more than a predetermined level of nitrogen is recycled to the feed end of the bed together with feed air being used to increase the pressure thereof from said intermediate pressure level to said upper adsorption pressure.

32. The process of claim 27 in which said additional coproduct gas containing more than a predetermined level of nitrogen is recycled to the feed end of a bed at upper adsorption pressure prior to said introduction of nitrogen copurge thereto.

33. The process of claim 1 and including discharging said additional coproduct gas from the system until a desired nitrogen level is reached before commencing said recycle to the feed end of the bed.

34. The process of claim 1 and including temporarily discontinuing the passage of feed air to the bed while said additional coproduct gas is being recycled to the feed end of the bed.

35. The process of claim 34 in which said additional coproduct gas is used to complete repressurization to said upper adsorption pressure without further introduction of feed air to the bed.

36. An adiabatic pressure swing adsorption process for the selective adsorption of more readily adsorable component of a gas mixture, and the recovery of said component as a high purity product, in an adsorption system having at least two adsorbent beds, each of which undergoes, on a cyclic basis, a processing sequence comprising:

(a) introducing an enriched less readily adsorbable coproduct effluent gas component withdrawn from the discharge end of another bed in the system to the discharge end of said bed, alone, before and/or simultaneously with the passage of feed gas mixture to the feed end of the bed, thereby increasing the pressure of the bed from a desorption pressure to an intermediate pressure level;

(b) passing said feed gas mixture to the feed end of said bed, with or without the passage of coproduct effluent to the discharge end thereof, for use in increasing the pressure thereof from said intermediate pressure level to an upper adsorption pressure;

(c) introducing more readily adsorbable component copurge gas to the feed end of the bed at said upper adsorption pressure to displace enriched less readily adsorbable component effluent gas from the discharge end of the bed, a portion of said less readily adsorbable coproduct effluent gas component being introduced to the discharge end of a bed being pressurized from said desorption pressure level, the concentration of said more readily adsorbable component present with said less readily adsorbable component effluent gas increasing during said copurge step which is continued until the concentration of the more readily adsorbable component reaches a predetermined level in said coproduct effluent stream;

(d) introducing additional copurge gas to the feed end of the bed at said upper adsorption pressure after the more readily adsorbable component concentration reaches said predetermined level in said effluent gas stream, with the additional displaced effluent gas containing more than said predetermined level of more readily adsorbable component concentration therein being recycled to the feed end of a bed in the system at a pressure of from said intermediate pressure level to said upper adsorption pressure;

(e) countercurrently depressurizing said bed from the upper adsorption pressure to a lower pressure with discharge of high purity more readily adsorbable component gas from the feed end of the bed, said discharged more readily adsorbable component gas comprising more readily adsorbable component copurge gas and/or more readily component product gas;

(f) further countercurrently depressurizing said bed from said lower pressure to still lower desorption pressure with discharge of desorbed, high purity more readily adsorbable component product gas and/or copurge gas from the feed end of the bed, and (g) repeating sets (a)-(f) on a cyclic basis with additional feed gas mixture being passed to the bed being repressurized during step (b) or steps (a) and (b), whereby more readily adsorbable component product gas can be readily obtained at high purity and recovery levels, and said enriched less readily adsorbable component can also be obtained at relatively high recovery levels.

37. The process of claim 36 in which said upper adsorption pressure is in excess of atmospheric pressure.

38. The process of claim 36 in which said upper adsorption pressure is approximately atmospheric pressure.

39. The process of claim 36 in which said introduction of less readily adsorbable component to the discharge end of the bed initially at said desorption pressure is carried out prior to and simultaneously with the passage of feed gas mixture to the feed end of the bed.

40. The process of claim 36 in which the feed gas mixture comprises CO and nitrogen.

41. The process of claim 36 in which said feed gas mixture comprises $CO_2$ and methane.

42. The process of claim 36 in which said feed gas mixture comprises methane and nitrogen.

43. The process of claim 36 in which said feed gas mixture comprises ethane and ethylene.

44. The process of claim 36 in which said additional coproduct effluent gas containing more than a predetermined level of more readily adsorbable component concentration therein is recycled for addition to the feed end of the bed together with the feed gas mixture being used to increase the pressure thereof from said intermediate pressure level to upper adsorption pressure.

45. The process of claim 44 in which said upper adsorption pressure is in excess of atmospheric pressure and said lower pressure is approximately atmospheric pressure.

46. The process of claim 44 in which said upper adsorption pressure is about atmospheric pressure.

47. The process of claim 36 in which said additional coproduct effluent gas containing more than a predetermined level of more readily adsorbable component concentrations therein is recycled for introduction to the feed end of a bed at upper adsorption pressure prior to said introduction of more readily adsorbable component copurge gas thereto.

48. The process of claim 47 in which said upper adsorption pressure is in excess of atmospheric pressure and said lower pressure is approximately atmospheric pressure.

49. The process of claim 47 in which said upper adsorption pressure is about atmospheric pressure.

50. The process of claim 36 in which said still lower desorption pressure comprises a subatmospheric desorption pressure.

* * * * *